E. L. GILMAN.
Printing Presses.
No. 9,346.
Reissued Aug. 17, 1880.
Fig. 1.
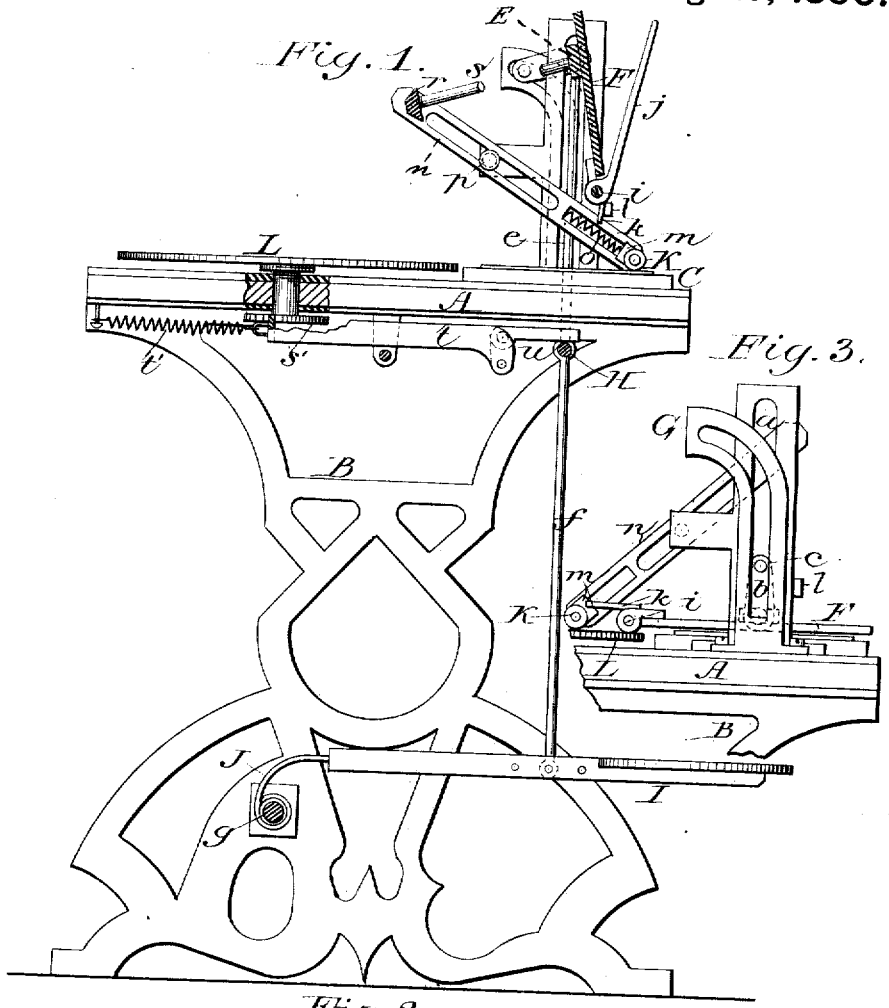
Fig. 3.
Fig. 2.
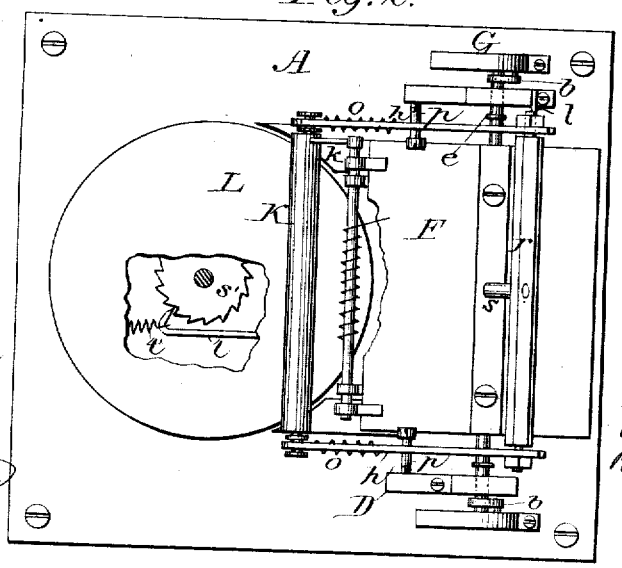
Fig. 4.
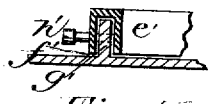
Fig. 5.
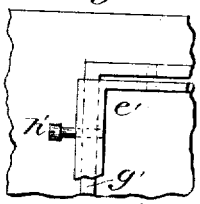
Witnesses:
Alex. Scott
Geo. M. Hunter
Inventor:
E. L. Gilman
By C. E. Foster
Atty.
N. PETERS, PHOTO-LITHOGRAPHER, WASHINGTON, D. C.

UNITED STATES PATENT OFFICE.

EDWARD L. GILMAN, OF SOMERVILLE, MASSACHUSETTS.

PRINTING-PRESS.

SPECIFICATION forming part of Reissued Letters Patent No. 9,346, dated August 17, 1880.

Original No. 203,335, dated May 7, 1878. Application for reissue filed June 17, 1880.

*To all whom it may concern:*

Be it known that I, EDWARD L. GILMAN, a citizen of the United States, residing at Somerville, in the county of Middlesex and State of Massachusetts, have invented a new and Improved Printing-Press, of which the following is a specification.

My invention relates mainly to that class of printing-presses denominated "foot-presses;" and the object thereof is to provide a simple, effective, and inexpensive self-inking printing-press for the use of job-printers and others. I attain the above-named object by the construction and combination of the devices illustrated in the accompanying drawings, in which—

Figure 1 is a side elevation, partly in section, of my improved printing-press. Fig. 2 is a plan view. Fig. 3 is a detail view, showing the arrangement of the platen and inking apparatus and standards for supporting and guiding the same. Fig. 4 is a transverse section, and Fig. 5 a plan view, showing a modified form of chase and bed.

Like letters refer to like parts in the several figures.

The construction of my improved printing-press, as herein shown, provides for such a disposition of the platen relative to the operator and to the type-form, owing to the position it automatically assumes in front of the printer to receive and deliver the paper and its direct vertical movement as it approaches and presses against the face of the type, as renders it particularly advantageous as a foot-press.

In the drawings, A is the bed of the press, supported by standards or legs B, and having upon its upper surface the frame or stationary chase C. At the ends of this frame posts D, having vertical slots *a*, are secured to the bed.

A shaft, E, is secured to the back of the platen F, the ends of which are fitted to and project through the said slots *a* in posts D. Each end of said shaft E is provided with an arm, *b*, standing at right angles to the axial line of said shaft, and in each of said arms is set a stud, *c*, at right angles thereto, said arms and studs constituting relative to the ends of shaft E a crank upon each end thereof.

As above stated, the posts D are secured to the bed at the ends of frame C, and the posts G, provided with the curved slots *d*, are secured to the bed by the side of and near to the posts D, as shown. Thus each straight end of shaft E adjoining the platen passes through one of the vertical slots *a* in the posts D, and the studs *c* project into the slots *d* in said posts G, which slots, as shown in Fig. 3, are curved at their upper ends, but their lower portions run vertically, or at right angles to the upper surface of frame C.

When the platen F rests with its face against said frame, as seen in Fig. 3, the ends of shaft E project through the lower ends of the vertical slots *a* in posts D, arms *b* thereon projecting upward between posts D and G, and studs *c* projecting outwardly from said arms into the slots *d* in the latter-named posts. As the platen leaves the bed it maintains its horizontal position, which is not altered so long as the shaft E and the studs are in the parallel portions of the slots in the standards D and G; but when the studs enter the curved portions of the slots in the standards G the platen will turn until its face is vertical, or nearly so, and presented in a position to receive the sheet to be printed. Vertical rods *e* extend upward through the bed A between the ends of the frame C and the posts D, and are apertured to receive the shaft E, and their lower ends are attached to a cross-bar, H, below the bed, which is connected with the treadle I by means of the connecting-rod *f*. The treadle I is connected with a cross-bar, *g*, that connects the standards B by a spring, J, which is wound around the said bar and attached to said treadle. This spring serves to raise the treadle and the parts connected with it when the pressure of the foot is removed.

A shaft, *i*, carrying the tympan-fingers *j*, is journaled at the lower or rear edge of the platen, and has attached to it a spring for throwing said fingers against the platen, and at one of its ends an arm, *k*, which strikes a pin, *l*, projecting from one of the posts as the platen swings beyond a vertical position, as seen in Fig. 1, and throws the fingers *j* from the face of the platen.

The ink-roller K is journaled in movable boxes *m* in the lower ends of the slotted arms *n*, and the boxes are held to the lower end of the slots by springs *o*. These slotted arms are guided by studs $p$, that project from arms formed on the posts D, as shown, and are pivoted at their upper ends to a cross-bar, $r$, which is rigidly connected to the back of the platen by an arm, $s$. A revolving ink-table, L, is journaled in the press-bed, with its face in the same plane as the face of the type.

A ratchet, $s'$, is attached to the lower end of the shaft of the ink-table, and is engaged by a hook-pawl, $t$, that is drawn forward by the coil-spring $t'$, and is drawn back so as to turn the table by a right-angled lever, $u$, which is connected with it and pivoted to the under side of the bed A. The longer arm of this lever is engaged by the cross-bar H as it is thrown upward by the spring-treadle I.

The operation of my press is as follows, viz: The type to be printed from is placed on the press-bed in the frame and locked and planed, the ink-table L is charged with ink, and the paper to be printed is placed against the face of the platen while it stands in the position seen in Fig. 1 back of the tympan-fingers $j$. The treadle is now carried downward by the foot, and as rods $e$, attached to the shaft E of the platen, draw the latter downward, the impingement of the studs $c$ on arms $b$ against the under edge of the curved portion of the slots $d$ in posts G causes the platen gradually to turn from its starting inclined position, and so to move until studs $c$ reach and follow, conformably with the straight portion of shaft E, the lower vertical portions of the slots in both of the posts D and G, when the platen continues to move vertically toward the types, and finally to strike them squarely. As the platen begins to move as aforesaid the swinging of the bottom edge of it backward releases arm $k$ on shaft $i$ from its contact with pin $l$, allowing the spring shown on shaft $i$ in Fig. 2 to rock said shaft, throwing the tympan-fingers $j$ against the face of the platen and clamping the paper there. The ink-roller is also carried back to the ink-table by the swinging of the slotted arms $n$ on studs $p$ through their connection with the platen by arm $s$, and the platen with its paper to be printed is brought down upon the type. Upon relieving the treadle from pressure the spring J returns the parts to the position whence they started, and as the cross-bar H rises it strikes the lever $u$ and rotates the ink-table.

The chase shown in Figs. 4 and 5 consists of a rectangular frame, $e'$, having grooves $f'$ in its ends, which fit over ribs $g'$, formed on the bed of the press. The chase is held in place by screws $h'$, which pass through the ends of the chase and through the ribs.

By using a hand-roller the automatic inking device may be dispensed with.

I am aware that it is not new to employ in a printing-press a spring-treadle in connection with the platen, spring tympan-fingers, or a rotating ink-table; but my platen is in a horizontal position when down against the type, rises in a vertical line therefrom for a certain distance, swings over while rising, carrying its face beyond a vertical plane to an inclined one, and in so doing causes the arm (in center of platen, whose cross-bar carries the inking-roll in slotted arms) to make a curved sweep sufficient to carry the ink-roller forward over the ink-table and type, while the same motion throws forward the arm on the shaft of the spring-fingers, which causes it to strike a stud and release the printed paper.

I am aware that a vertical bed has been used in combination with a platen operated to approach and recede parallel to the bed and to turn to an angle to receive the sheets to be printed; but all such arrangements require large frames, complex operating appliances, and interfere with free access to the bed, while the disposition of parts above described enables me to avail myself of small light frames, operating appliances of a most simple character, and renders the bed easily accessible without the necessity of sliding it or the platen laterally one from the other.

What I claim as my invention is—

1. The combination, with the platen and appliances for reciprocating the same vertically and swinging it above the bed, of slotted arms $n$, studs $p$, supporting the same, ink-roller K, carried by said arms, and cross-bar $r$, connected to the platen by an arm, $s$, all substantially as set forth.

2. In a printing-press, the combination of a stationary horizontal bed and platen arranged above the same, and appliances, substantially as described, for reciprocating the platen vertically and turning it from a horizontal to a vertical position and back, as set forth.

3. In a printing-press, the combination, with a horizontal stationary bed, horizontal inking-plate, and roller reciprocating across the two, of a platen arranged above the bed and appliances, whereby the same is reciprocated vertically parallel to the bed and turned to a vertical position to receive the sheet and back, all as set forth.

4. The combination of the horizontal stationary type-bed, platen constructed to receive and hold the sheets to be printed, appliances for guiding and turning the platen above the bed, and a treadle connected to the platen to operate the same, as set forth.

EDWARD L. GILMAN.

Witnesses:
JOSEPH B. FROST,
GEO. G. FROST.

Correction for Reissued Letters Patent No. 9,346.

It is hereby certified that at the time Reissued Patent No. 9,346 was granted to Edward L. Gilman, of Boston, Mass., for an Improvement in Printing Presses, Aug. 17, 1880, there was on record in this Office (Liber T25, page 85,) an assignment from said Gilman of his entire interest, to the Gilman Vertical Press Co. of Boston, Mass., and that the patent should have been issued to said assignee; that the correction has been made in the file and papers relating to the case, and is hereby made in said Letters Patent to make the title therein conform to the records of the Office.

Signed, countersigned, and sealed this 15th day of November, A. D. 1880.

[SEAL.]

A. BELL,
*Acting Secretary of the Interior.*

Countersigned:

E. M. MARBLE,
*Commissioner of Patents.*